United States Patent [19]
Pan et al.

[11] Patent Number: 5,689,367
[45] Date of Patent: Nov. 18, 1997

[54] POLARIZATION BEAM SPLITTER

[75] Inventors: J. J. Pan, Milpitas; Kai Zhang, San Jose; Yonglin Huang, Milpitas, all of Calif.

[73] Assignee: E-Tek Dynamics, Inc., San Jose, Calif.

[21] Appl. No.: 542,871

[22] Filed: Oct. 13, 1995

[51] Int. Cl.$^6$ ............ G02B 5/30; G02B 27/28; G02B 27/14
[52] U.S. Cl. ............ 359/495; 359/496; 359/629; 359/638
[58] Field of Search ............ 359/494, 495, 359/496, 618, 629, 638

[56] References Cited

U.S. PATENT DOCUMENTS 3,720,457  3/1973  Swartz et al. ............ 359/495

OTHER PUBLICATIONS

A. Shibukawa et al. "Compact Optical Circulator for Near Infrared Region", Electronics Letters vol. 14, No. 25, Dec. 1998, pp. 816–817.
Hecht, "Optics", 2nd edition, Addison–Wesley Publishing Co., Inc., 1987, pp. 288–292.

*Primary Examiner*—Paul M. Dzierzynski
*Assistant Examiner*—Darren E. Schuberg
*Attorney, Agent, or Firm*—Townsend and Townsend and Crew LLP

[57] ABSTRACT

An improved polarization beam splitter formed by a collimator and two similarly shaped, birefringent crystal prisms is provided. The light from the collimator is incident upon the first face of the first birefringent crystal prism which also has second and third faces. The collimated light is incident upon the second face at an angle $\phi$ with respect to a line normal to the second face so that light polarized perpendicular to a plane of incidence upon the second face is reflected toward the third face and light polarized in the plane of incidence is refracted at the second face. The second birefringent crystal prism has a second face parallel to, and in close proximity with, the second face of the first birefringent prism so that light refracted at the second face of said first prism is refracted at the second face of the second prism and into the second prism. A first face of the second prism is positioned with respect to its second face so that light refracted into the second prism is refracted at the first face from the second prism cross-sectionally undistorted with respect to a cross-section of the light polarized in the plane of incidence at the second face of the first prism. This polarization beam splitter can handle high power without distorting the beam.

1 Claim, 4 Drawing Sheets

POLARIZATION BEAM SPLITTER

BACKGROUND OF THE INVENTION

The present invention relates to optical fiber network device technology and, more particularly, to devices which can split light signals responsive to the polarization of the light signals.

In modern fiberoptic telecommunications, more and more reliance is being placed on the state of polarization of light signals. Typically the polarization of the signal is used to help direct the signal along the fiberoptic network. Network components or devices which function based upon the polarization of light signals include fiberoptic polarization tunable filters, depolarizers, binary polarization switch/modulators, polarization division multiplexers and many other polarization related fiberoptic components. Many, if not all, of these devices require fiberoptic polarization beam splitters (PBSs). For example, devices using PBSs are described in U.S. appln. Ser. No. 08/406,212 entitled, "VARIABLE POLARIZATION BEAM SPLITTER, COMBINER AND MIXER", filed Feb. 22, 1995 by J. J. Pan and assigned to the present assignee.

A conventional polarization beam splitter cube, a pair of right angle prisms, is often used for its polarization beam splitting functions. The face of the hypotenuse of one prism is bonded to the hypotenuse face of the second prism with special dielectric materials to form a polarizing beam splitter cube with an internal interface at an angle 45° to the external faces of the cube. Incoming light which travels perpendicularly to one of the external faces is refracted through the interface or reflected at the interface 90° to the incoming light according to the polarization of the light. Light which is linearly polarized in the plane of incidence is transmitted through the cube. Light which is linearly polarized perpendicularly to the plane of incidence is reflected by the cube. However, the polarization beam splitter cube cannot handle signals at high power, which is desirable in modern applications.

Another type of polarization beam splitter is the Glan-Laser PBS in which two right angle prisms of birefringent crystals are used. The face of the hypotenuse of one prism is separated slightly from the hypotenuse face of the second prism. The Glan-Laser PBS is capable of handling high-power signals, but the shape of the light beams reflected from the cube are distorted. This distortion can cause undesirable effects upon the PBS and makes the Glan-laser PBS unsuitable in some applications.

The present invention also solves or substantially mitigates these problems by providing for a PBS which is capable of handling high-power signals without distortion of either the reflected and refracted signals. Furthermore, the PBS is adaptable for miniaturization as an element in fiberoptic network devices.

SUMMARY OF THE INVENTION

The present invention provides for a collimator subassembly for introducing collimated light, a first birefringent crystal prism and a second birefringent crystal prism, each of the prisms having first, second and third faces. The collimator subassembly and the first face of the first prism are arranged so the collimated light from the subassembly is incident upon the first face. After being refracted at the first face into the first prism, the collimated light is incident upon the second face of the first prism at an angle $\phi$ with respect to a line normal to said second face so that light polarized perpendicular to a plane of incidence upon the second face is reflected toward the third face, and light polarized in the plane of incidence is refracted at the second face from the first prism. The second prism has its second face parallel to, and in close proximity with, the second face of the first prism so that light refracted at the second face of the first prism is refracted at the second face of the second prism into the second prism. Likewise, the first and second faces of the second prism are respectively parallel to the first and second faces of the first prism. Thus the first face of the second prism is positioned with respect to its second face so that light refracted into the second prism is refracted at the first face from the second prism cross-sectionally undistorted with respect to a cross-section of the light polarized in said plane of incidence at the second face of the first prism.

DETAILED DESCRIPTION OF PREFERRED EMBODIMENT(S)

Figure 1:
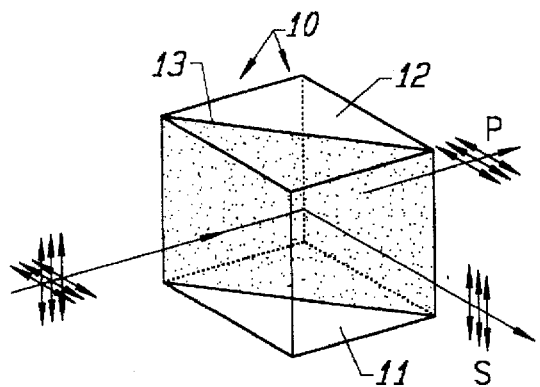
FIG. 1 is an perspective view of a PBS cube in the prior art.

FIG. 1 illustrates a PBS cube 10 formed by two right-angle prisms 11 and 12, as explained above. The hypotenuse face of one prism 11 is bonded to the hypotenuse face of the second prism 12 with special dielectric materials to form an interface 13. Depending upon the state of polarization of the collimated light, the cube 10 at the interface 13 splits an input beam of collimated light into a P-component and an S-component. These two polarized and split beams are at 90° from each other. The P-component beam which passes straight through the cube 10 is linearly polarized in the plane of incidence at the interface. The S-component beam which emerges from the cube at right angles to the incident beam is linearly polarized orthogonal to the plane of incidence.

Figure 2:
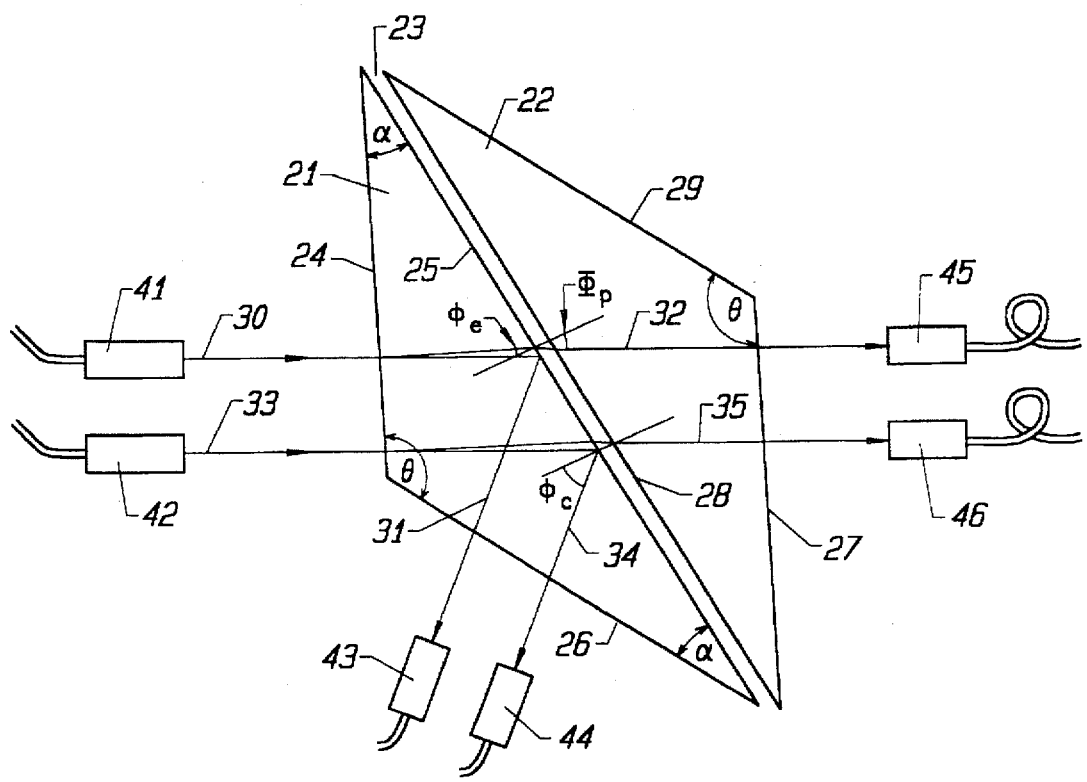
FIG. 2 is a top view diagram of a PBS according to the present invention.

FIG. 2 illustrates a top view of a PBS according to an embodiment of the present invention. The PBS has two birefringent crystal prisms 21 and 22 placed so that corresponding interface side faces 25 and 28 are separated by a slight air gap 23. In the cross-sectional top view of FIG. 2, the prisms 21 and 22 are shown as two isosceles triangles, each having an apex angle $\Theta$ formed by the side faces 24 and 26, and 27 and 29 respectively. Usually, the prisms are formed from the same material, though it is possible for the prisms to be different. The direction of optical axis and the orientation of the side faces of the first prism 21 are arranged so that the orthogonally linear polarizations of an unpolarized light beam 30 entering the first face 24 of the first prism 21 is broken into two beams 31 and 32 (with orthogonally linear polarizations) by the birefringent crystal prism 21. One of the beams 32 is refracted through the second face 25 of the first prism 21 to the corresponding second face 28 of the second prism 22. The other beam 31 is totally and internally reflected at the second face 25. This function is similar to that of a conventional PBS. In the present invention the birefringent nature of the crystal 21, with two indices of refraction, is used to help separate the light components according to their polarization.

A third side face 26 of the first prism 21 is oriented so the totally internally reflected beam 31 is refracted through the third face 26 without changing the wavefront and the spot size of the beam. The refracted beam 32 through the second face 25 of the first prism 21 experiences a wavefront change and a spot size change after passing through the face 25. These changes distort the beam and can cause a large polarization dependent loss (PDL). With the second prism 22, these problems are avoided because the wavefront of the beam and its spot size are corrected to the original position and shape by the reciprocal symmetry of the second prism 22 with respect to the first prism 21. Stated differently, the polarized beams from two parallel beams 30 and 33 separated by a given distance and entering one face 24 of the first prism 21, as shown in FIG. 2, leave each face 26 and 27 parallel and separated by the same distance. The beams 31 and 34 are in one linear polarization state and leave the prism face 26 parallel and separated by the same distance as the beams 30 and 33; likewise, the beams 32 and 35 are in a perpendicular linear polarization state and leave the prism face 27 parallel and also separated by the same distance as the beams 30 and 33.

The particular PBS of FIG. 2 is formed from lithium niobate, $LiNbO_3$. Other birefringent crystals, such as rutile, calcite, $TeO_2$, or $YVO_4$, can be used for the prisms 21 and 22. $LiNbO_3$ is used as an example. The refractive index of $LiNbO_3$ for the ordinary beam (o-beam) is larger than that for the extraordinary beam (e-beam), i.e., $n_o > n_e$. Although different optical axis orientations can also be used, the case where the optical axis of the crystal is perpendicular to the base plane (z-cut) is described in FIG. 2. The side angle $\alpha$ between the surfaces 24 and 25 of the prism 21 is determined so that the o-beam (which polarization lies within the principal plane) entering the face 24 is totally internally reflected by the surface 25 and transmitted through the surface 26 without changing the distance between the two input beams 30, 33. The e-beam (which polarization is perpendicular to the principal plane) entering the surface 24 will be refracted by the surface 25. Mathematically, the following conditions are satisfied at the same time:

$$n_e \sin(\phi_e) = \sin(\Phi_e) < 1, \; n_o \sin(\phi_o) > 1.$$

These conditions are for negative uniaxial birefringent crystals, where $n_o > n_e$. If the crystals used for the PBS are positive uniaxial birefringent crystals, where $n_o < n_e$, then the conditions are:

$$n_o \sin(\phi_o) = \sin(\Phi_o) < 1, \; n_e \sin(\phi_e) > 1.$$

Figure 3:
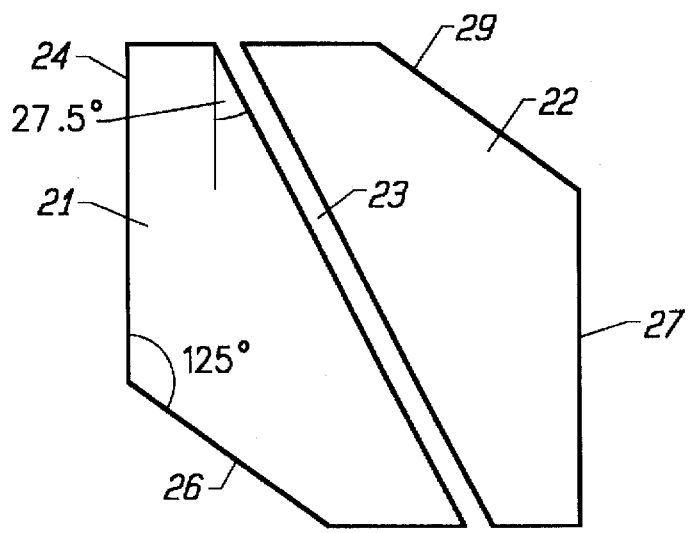
FIG. 3 is a top view diagram of a modified PBS of FIG. 2.

Lithium niobate prisms having $\Theta = 125°$ and $\alpha = 27.5°$ have been found to work effectively. Furthermore, prism may be modified as needed. In FIG. 3, the ends of the prisms 21 and 22 have been trimmed for easier packaging.

The beams 30 and 33 directed toward the face 24 of the first prism 21 are collimated. The polarized beam components 31 and 34 leaving the face 26 and the polarized beam components 32 and 35 leaving the face 27 of the second prism 22 are also collimated. The beams can be coupled to optical fibers with collimator subassemblies 40–45 illustrated in FIG. 2. Each subassembly holds the end of its respective optical fiber in a coaxial relationship with a collimator, either a standard lens or a GRIN lens. While standard lenses could also be used as collimators, it has been found that quarter-pitch GRIN (GRaded INdex) lenses provide better performance, easier manufacturing and greater durability. More particular information on the manufacture of these GRIN lens/optical fiber subassemblies may be found in U.S. Pat. No. 5,208,876 entitled, "AN IMPROVED OPTICAL ISOLATOR", which issued on May 4, 1993 to J. J. Pan and assigned to the present assignee.

The resulting PBS has a very high extinction ratio, a measure of discrimination, or splitting, of the input light into perpendicular linearly polarized light components of more than 60 dB. For comparison, the conventional PBS cube has an extinction ratio of about 30 dB. The resulting PBS can also handle input light signals of much high power than the PBS cube can, and the output light signals from the described PBS are not distorted, a significant advantage over the Glan-Laser PBS.

Figure 4:
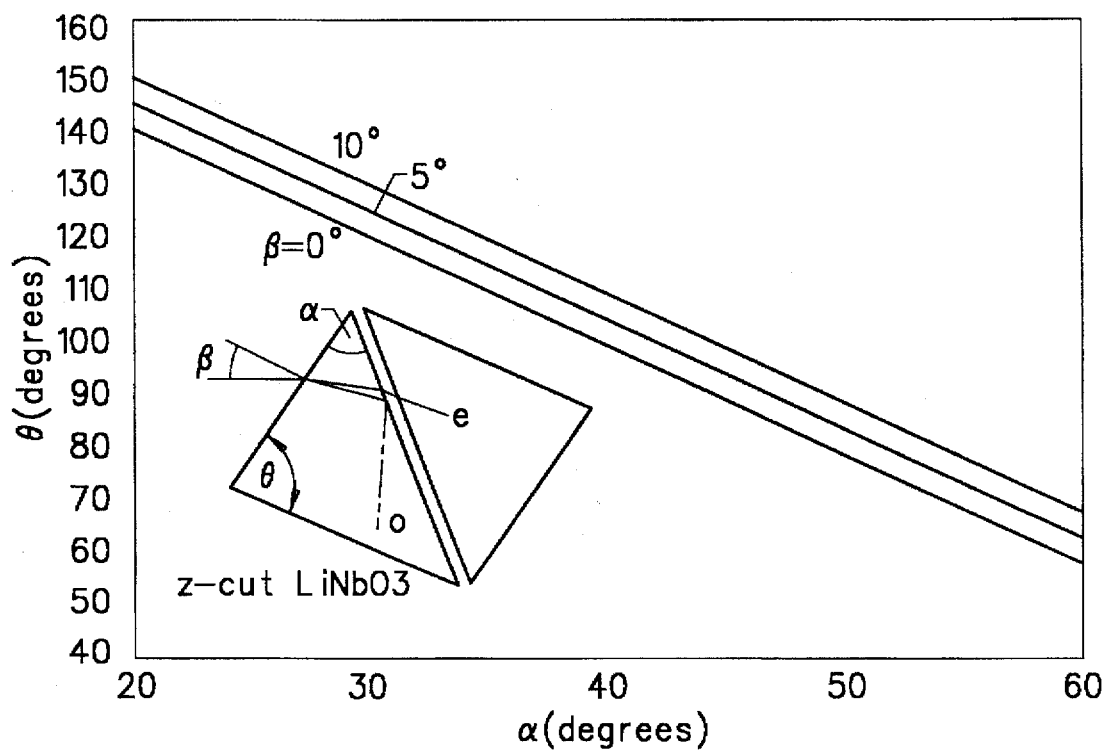
FIG. 4 is a graph of suitable conditions for $\Theta$, the apex angle between the side faces, $\alpha$, the side angle, and $\beta$, the incident angle of an input beam to one of the side faces, for a z-cut LiNbO$_3$ birefringent prism to operate according to the present invention.

FIG. 4 illustrates the relationship between the $\Theta$, the apex angle, and $\alpha$, the side angle of the PBS prisms, at which the conditions above are satisfied at three different angles for $\beta$, the angle from normal at which an input beam is incident upon a side face of the prism 21, as diagrammed in the insert into the lower left corner of the FIG. 4 graph.

Figure 5:
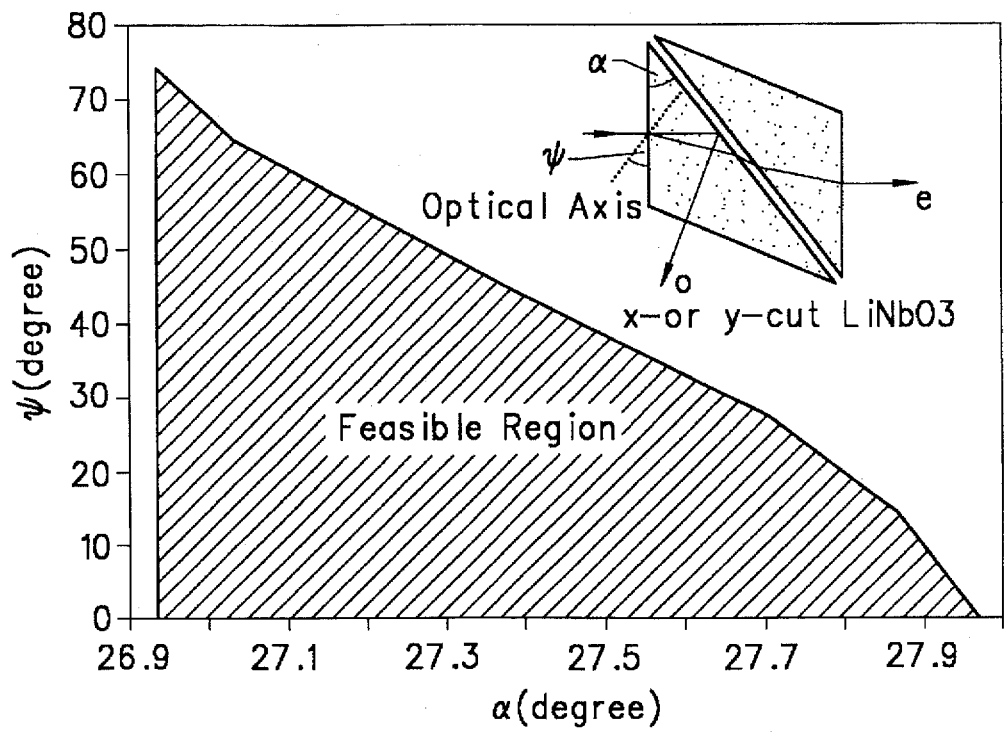
FIG. 5 is a graph plotting $\Psi$, an angle measuring the orientation of the optic axis in the x–y plane, versus $\alpha$, the side angle, for an x or y-cut LiNbO$_3$ birefringent prism to operate according to the present invention.

FIG. 5 shows where the conditions above are satisfied for a lithium niobate prism as the side angle $\alpha$ of the prism is varied and the orientation of the optic axis of the birefringent prism is changed in the x–y plane (the plane of the drawing). The orientation of the optic axis is measured by the angle $\Psi$ with respect to the side surface and the satisfied region is shaded.

Figure 6A:
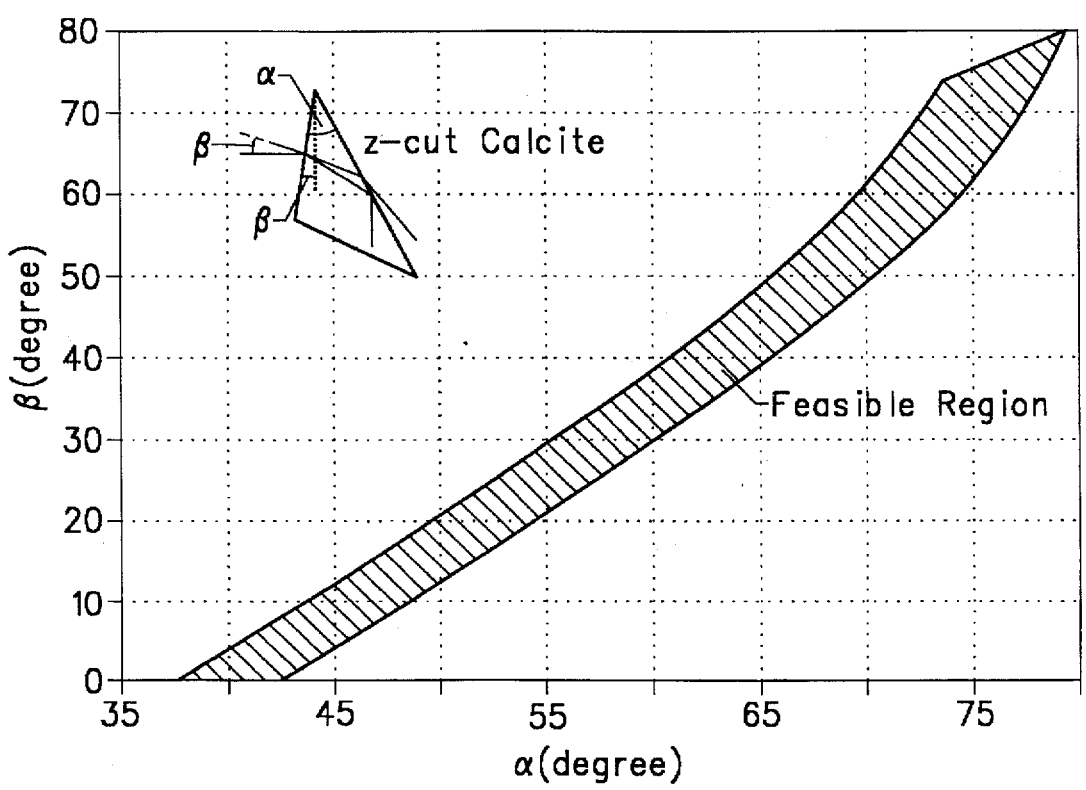
FIG. 6A is a graph plotting $\beta$, the incident angle of an input beam to one of the side faces, versus $\alpha$, the side angle, for a z-cut calcite birefringent prism to operate according to the present invention.
Figure 6B:
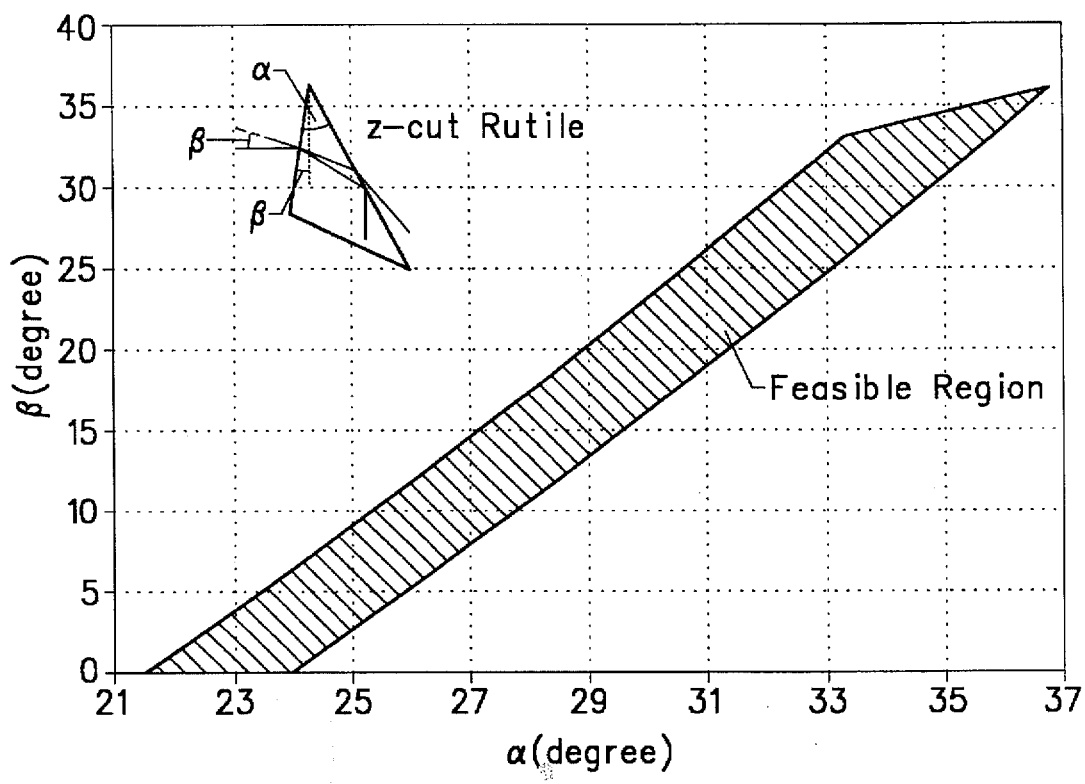
FIG. 6B is a graph plotting $\beta$ versus $\alpha$ for a z-cut rutile birefringent prism according to the present invention.

The shaded region in FIG. 6A illustrates where the conditions above are satisfied for a z-cut calcite crystal where the side angle $\alpha$ and angle of incidence $\beta$ of the beam are varied. While it is desirable that a beam be substantially normal to the face, $\beta$ near zero, for maximum transmission through the face, the FIG. 6A graph shows that other beam angles could be used. The shaded region in FIG. 6B shows the same for a z-cut rutile crystal.

While the above is a complete description of the preferred embodiments of the present invention, various alternatives, modifications and equivalents may be used. It should be evident that the present invention is equally applicable by making appropriate modifications to the embodiment described above. For example, while the present invention has been discussed in terms of fiberoptic applications, it also has applications in optics. Where a prior art PBS has been used, the present invention may also be utilized. Therefore, the above description should not be taken as limiting the scope of invention which is defined by the metes and bounds of the appended claims.

What is claimed is:

1. A polarization beam splitter comprising
   a GRIN lens for introducing collimated light;
   a first birefringent crystal prism having first, second and third faces, said collimated light incident upon said first face, said collimated light incident upon said second face at an angle $\phi$ with respect to a line normal to said second face so that light polarized perpendicularly to a plane of incidence upon said second face is reflected toward said third face and refracted at said third face from said first prism cross-sectionally undistorted with respect to a cross-section of said collimated light incident at said first face, and light polarized in said plane of incidence is refracted at said second face; and a second birefringent crystal prism having a second face parallel to, and in close proximity with, said second face of said first birefringent prism so that light refracted at said second face of said first prism is refracted at said second face of said second prism and into said second prism, and a first face positioned with respect to said second face so that light refracted into said second prism is refracted at said first face from said second prism cross-sectionally undistorted with respect to a cross-section of said light polarized in said plane of incidence at said second face of said first prism;

wherein said first prism comprises $LiNbO_3$, said first and third faces forming an angle of 125° with respect to each other, and said first and third faces each forming an angle of 27.5° with respect to said second face.

* * * * *